United States Patent [19]
Gopinath et al.

[11] Patent Number: 5,909,369
[45] Date of Patent: Jun. 1, 1999

[54] COORDINATING THE STATES OF A DISTRIBUTED FINITE STATE MACHINE

[75] Inventors: Bhaskarpillai Gopinath, Watchung; Peter Zenon Onufryk, North Plainfield, both of N.J.

[73] Assignee: Network Machines, Inc., Piscataway, N.J.

[21] Appl. No.: 08/690,255

[22] Filed: Jul. 24, 1996

[51] Int. Cl.$^6$ .......................... G05B 15/00; G05B 19/18
[52] U.S. Cl. .......................... 364/132; 364/141; 364/142; 364/155
[58] Field of Search .......................... 364/132, 141–142, 364/155, 143; 395/290, 200.05; 340/825.07, 825.08, 825.5, 825.16

[56] References Cited

U.S. PATENT DOCUMENTS

| | | | |
|---|---|---|---|
| 4,740,891 | 4/1988 | Kirkpatrick | 364/200 |
| 4,817,037 | 3/1989 | Hoffman et al. | 364/200 |
| 4,845,712 | 7/1989 | Sanner et al. | 371/25 |
| 5,031,095 | 7/1991 | Hara et al. | 364/200 |
| 5,062,044 | 10/1991 | Asami et al. | 364/200 |
| 5,140,680 | 8/1992 | Best | 395/325 |
| 5,237,696 | 8/1993 | Best | 395/725 |
| 5,255,375 | 10/1993 | Crook et al. | 395/325 |
| 5,263,172 | 11/1993 | Olnowich | 395/800 |
| 5,265,216 | 11/1993 | Murphy et al. | 395/325 |
| 5,280,623 | 1/1994 | Sodos et al. | 395/325 |
| 5,319,678 | 6/1994 | Ho et al. | 375/106 |
| 5,341,495 | 8/1994 | Joyce et al. | 395/500 |
| 5,341,501 | 8/1994 | Keeley et al. | 395/725 |
| 5,343,503 | 8/1994 | Goodrich | 375/121 |
| 5,361,260 | 11/1994 | Mito | 370/85.1 |
| 5,384,769 | 1/1995 | Oprescu et al. | 370/24 |
| 5,404,137 | 4/1995 | Levien | 340/825.07 |
| 5,436,887 | 7/1995 | Eisenhuth | 370/24 |
| 5,444,847 | 8/1995 | Iitsuka | 395/287 |
| 5,448,591 | 9/1995 | Goodrich | 375/257 |
| 5,467,033 | 11/1995 | Yip et al. | 326/93 |
| 5,473,635 | 12/1995 | Chevroulet | 375/287 |
| 5,525,971 | 6/1996 | Flynn | 340/825.06 |
| 5,544,332 | 8/1996 | Chen | 395/288 |
| 5,551,017 | 8/1996 | Baxter | 395/550 |
| 5,555,548 | 9/1996 | Iwai et al. | 375/356 |
| 5,564,114 | 10/1996 | Popat et al. | 395/285 |
| 5,592,685 | 1/1997 | Pawloski | 395/882 |

*Primary Examiner*—William Grant
*Assistant Examiner*—Ramesh Patel
*Attorney, Agent, or Firm*—John T. Peoples

[57] ABSTRACT

The states of a distributed finite state machine composed of a plurality of devices are coordinated by a sequence of operations to effect a self-timed cycle. Each device is arranged to apply a voltage over one or more leads and measure the current on the corresponding leads. With the methodology, while engendering self-timed cycles, the number of leads interconnecting the devices is also minimized.

13 Claims, 6 Drawing Sheets

COORDINATING THE STATES OF A DISTRIBUTED FINITE STATE MACHINE

BACKGROUND OF THE DISCLOSURE

1. Field of the Invention

This invention relates to finite state machines and, more particularly, to a methodology and concomitant circuitry for coordinating the states of a finite state machine composed of two or more devices using a minimal number of interconnection wires among the devices.

2. Description of the Background

Flow control or event signaling in digital systems has traditionally been implemented using a master-slave arrangement. Conventionally, the master applies a voltage on one wire interconnecting the master and slave (the so-called "request" lead) to initiate flow control or event signaling, and the slave detects the applied voltage at its end of the wire. In turn, so as to inform the master that the slave has received the flow control or event signaling information, the slave applies a voltage on a second wire interconnecting the master and slave (the so-called "acknowledge" lead), and the master detects the applied voltage at its end of the second wire.

Typically, the request-acknowledge leads are used in conjunction with a data bus that also interconnects the master and slave in what is referred to in the art as the "two phase bundled data convention protocol". In this protocol, the master places data to be sent on a data bus and causes a request event by making a transition on the request lead. The slave takes the data from the data bus and signals the receipt of data as well as the ability to accept new data by making a transition on the acknowledge lead to thereby initiate an acknowledge event. There is a major difficulty with this protocol in that, while the control portion (i.e., the request-acknowledge communication) of the protocol is self-timed, the relationship between the control portion and the data bus is not delay insensitive. For instance, if the propagation delay of the data bus is substantially longer than the propagation delay of the request and acknowledge leads (e.g. due to path routing on a printed circuit board), the desired data may not be present on the data bus at the time the slave reads the bus.

Certain corrective arrangements or procedures have been implemented in an attempt to overcome the shortcomings of the foregoing protocol. The barrier to wide spread acceptance of these arrangements or procedures has been that they either doubled the number of wires, or relied upon multi-valued logic, or have not truly been delay insensitive.

In addition, the master-slave convention is asymmetric in that the master always transmits data and the slave always detects data—a symmetric system does not differentiate between the two devices terminating the ends of the interconnecting wires, and either device could initiate the transmission of information.

SUMMARY OF THE INVENTION

These problem areas as well as other shortcomings and limitations of the prior art are obviated, in accordance with the present invention, by an arrangement of devices and a signaling protocol which coordinates the states of the devices to thereby engender a sequence of self-timed cycles resulting in delay insensitive communication.

In accordance with the broadest aspect of the present invention, the states of a distributed finite state machine composed of a first device and a second device interconnected via a single electrical path and ground are coordinated, upon the determination of an initial state, by the following sequence of operations to effect a self-timed cycle: (i) transitioning the first device to a first transition state by applying a first voltage to the path at the first device; (ii) monitoring the current on the path at the second device to determine the state transition of the first device: (iii) transitioning the second device to a second transition state by applying a second voltage to the path at the second device in response to a change in current on the path at the second device; and (iv) monitoring the current on the path at the first device to determine the state transition of the second device.

One feature of the arrangement of the present invention is its usefulness with integrated circuit chips and circuit boards wherein input/output pins and/or routing paths are costly in terms of disproportionate usage of area on the chip or board. Moreover, self-timed systems will be a fundamental requirement in modern systems since with high clock rates it will be virtually impossible to build large, synchronous systems. Finally, to achieve the high rate of throughput required of modern systems, transfer of data over parallel paths is preferred compared to the rather slow serial communication over a single path.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in providing for the coordination of states in a finite state machine in the manner set forth in detail below.

A.) Two Device, Asymmetrical Finite State Machine

Figure 1:
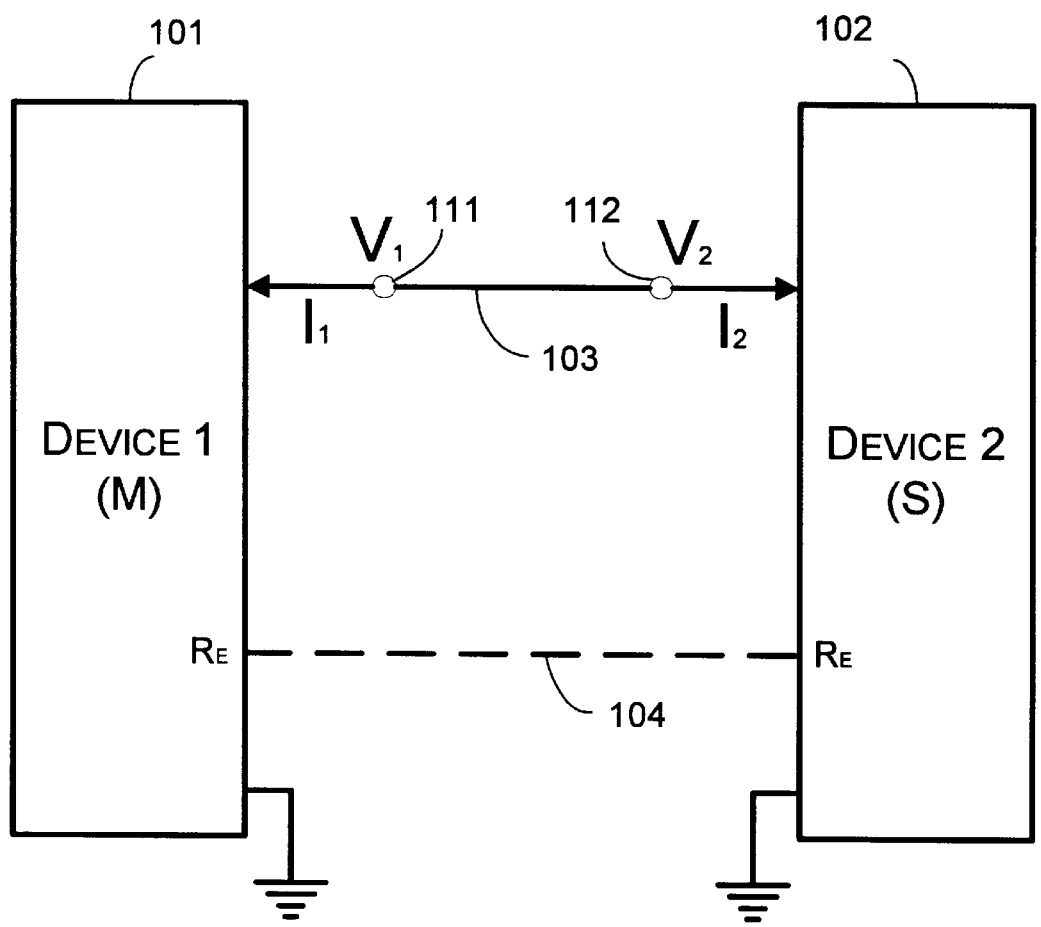
FIG. 1 illustrates an asymmetric finite state machine composed of two devices in a master-slave relationship interconnected by a wire.

With reference to FIG. 1, there is shown an illustrative embodiment of finite state machine 100 composed of two devices 101 and 102 interconnected by wire 103. Device 101, for purposes of the immediate discussion, is considered the master (M) device, whereas device 102 is the slave (S) device. Device 101 is coupled to one end of wire 103 via its input/output pin 111 and, similarly, device 102 is coupled to the other end of wire 103 via its input/output pin 112. The voltage level at pin 111 is designated as V1, and the current into pin 111 is designated I1; similarly, the voltage level at pin 112 is designated as V2, and the current into pin 112 is designated I2. (For the sake of ease of presentation, but without loss of generality, the components internal to devices 101 and 102 (not shown) and wire 103 are such that the voltages and currents are normalized to unity.) Also, for purposes of the immediate discussion, the initial conditions of devices 101 and 102 are such that both devices are enabled and V1=V2=0.

The following discussion focuses on Table 1 below:

TABLE 1

| System State | V1 | V2 | I1 | I2 |
|---|---|---|---|---|
| S1 | 0 | 0 | 0 | 0 |
| S2 | 1 | 0 | −1 | 1 |
| S3 | 1 | 1 | 0 | 0 |
| S4 | 0 | 1 | 1 | −1 |
| S1 | 0 | 0 | 0 | 0 |

The initial system state is S1 wherein both V1 and V2 are zero, and similarly I1 and I2 are zero. Master device 101 now typically executes a processing state (e.g., a processor (not shown) internal to device 101 may execute a software program), and at the end of the processing state, master 101 is to inform slave device 102 of the occurrence of the completion of the processing state by master 101. Master device 101 signals slave device 102 by applying a voltage V1=1 to pin 111 which, in turn, causes current I1=−1 into pin 111 and current I2=1 into pin 112; the state of overall system 100 at this point is shown as state S2 in Table 1. Slave device 102, which is arranged internally to detect current I2 into pin 112, has now been triggered so that slave device 102 may now execute its own processing state (e.g., a processor (not shown) internal to device 102 may execute a software program). At the end of this second processing state, slave device 102 is to inform master device 101 of the completion of this processing state. Slave device 102 signals master device 101 by applying a voltage V2=1 to pin 112 which, in turn, causes both I1 and I2 to become 0; the state of overall system 100 at this point is shown as state S3. Master device 101, which is also arranged internally to detect current I1 at pin 111, has now been released so that master device 101 may now execute its next processing state.

The above transitioning of states can now replicated with the current flows in the opposite direction. For instance, with the overall system in state S3, master device 101 triggers an event by removing the voltage V1=1 and by setting V1 =0. This results in I1=1 and I2=−1, that is, overall system state S4. Slave device 102 may then release master device 101, that is, inform master device 101 that it may execute its next processing state, by removing voltage V2=1 and setting V2=0; the overall system state then reverts back to state S1.

Each further transition cycle is a repeat of transitions through states S2–S3–S4–S1– . . . .

By way of short-hand notation, the succession of states given by S1–S2–S3 in Table 1 is referred to as a first self-timed cycle; similarly, the succession of states given by S3–S4–S1 is referred to as a second self-timed cycle. Then, by way of additional short-hand notation, it is convenient in the sequel to refer to either the first or second self-timed cycle as merely a self-timed cycle since the equivalent information is propagated by either the first or second self-timed cycle. This also implies that, although the initial state above was assumed to be state S1, it is equally possible to start a self-timed cycle from state S3. Thus, the process used to determine the initial state, such as by (i) using a system reset coupling the devices (shown by dashed line 104 in FIG. 1), or (ii) toggling the voltage on pins 111 and 112 by state devices 101 and 102, respectively, and detecting the differential between the expected and actual detected current flow into each device, can select either state S1 or state S3 as the starting point of a self-timed cycle.

B.) Two Device, Asymmetrical Finite State Machine With a Data Bus

Figure 2:
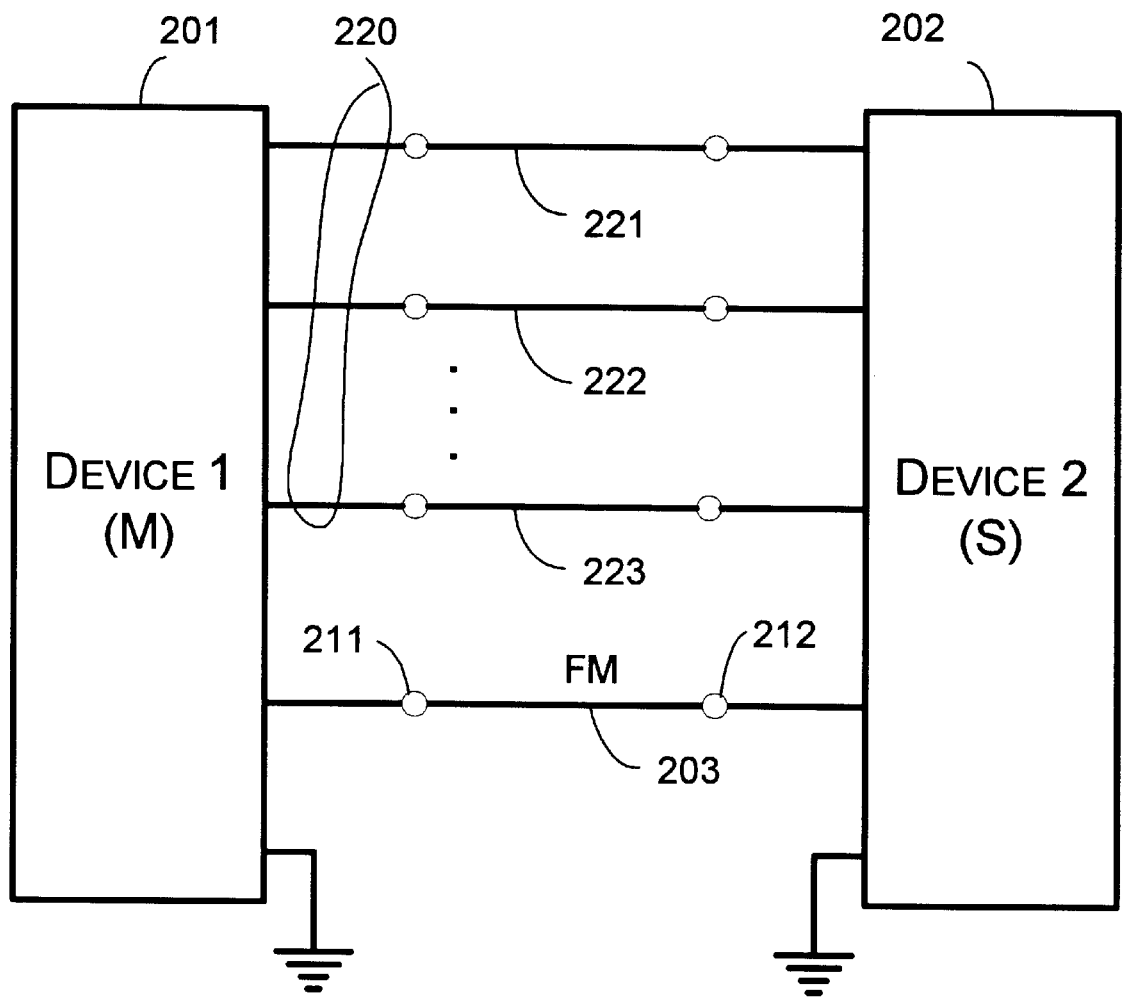
FIG. 2 illustrates an asymmetric finite state machine composed of two devices in a master-slave relationship interconnected by a parallel data bus and a frame marker wire.

Now with reference to FIG. 2, there is shown an illustrative embodiment of finite state machine 200 composed of two devices 201 and 202 interconnected by wire 203 and data bus 220; bus 220 has bus leads 221, 222, . . . , 223. Device 201, for purposes of discussion in this Section B., is considered the master device, whereas device 202 is the slave device. Device 201 is coupled to one end of wire 203 via its input/output pin 211 and, similarly, device 202 is coupled to the other end of wire 203 via its input/output pin 212. Wire 203, for reasons that will be evident momentarily, is referred to as the frame marker wire. In a manner substantially similar to the procedure discussed in the previous Section A., frame marker wire 203 implements a sequence of self-timed cycles coordinating devices 201 and 202.

Moreover, each lead of data bus 220 implements a self-timed cycle. Thus, for example, lead 221 can also be used by devices 201 and 202 to apply and remove voltages as well as detect the current flow on lead 221 at the respective ends of lead 221. Similar statements apply to the remaining leads 222, . . . , 223 of bus 220. Consequently, master device 201 and slave device 202 are interconnected with a plurality of electrical paths each capable of implementing a sequence of self-timed cycles. For instance, if bus 220 is a byte-wide bus, then there are nine separately operational self-timed cycles. To impart meaningful information over the bus, it is indeed necessary to coordinate the various states of the plurality of self-timed cycles, as now discussed.

The transfer of data in parallel over data bus 220 is performed in the following manner with reference to Table 1, assuming that frame marker wire 203 and the individual leads of data bus 220 all start in initial state S1. Data to be transferred over bus 220 is then placed on the individual leads of bus 220 by master device 201. For instance, suppose that a data bit of "1" is to be transmitted over bus lead 221, a data bit of "0" over bus lead 222, and a data bit of "0" over bus lead 223. Master device applies a voltage level indicative of the "1" data bit on its end of lead 221 (again, on a normalized basis, this voltage equals one volt), and does not place any voltage on leads 222 and 223 to convey the "0" bit; thus, the overall state of lead 221 advances from S1 to S2, whereas leads 222 and 223 remain in their respective S1 states.

At the input to slave device 202, a current only on lead 221 is detected, and slave 202 acknowledges to master device 201 that current has been detected by applying a voltage of one volt on the slave end of lead 221, thereby transitioning lead 221 from state S2 to state S3. Master device does not expect a similar acknowledgment from leads 222 and 223 since no voltage was applied to induce a transition. Once master 201 receives an acknowledgment from slave 202 over all leads that had a voltage applied initially by master 201, master 201 may now transition frame marker wire 203.

Master device 201, while maintaining all existing voltage levels on the various leads of bus 220, then signals slave device 202 over frame marker wire 203 by applying a voltage to pin 211 which results in a current into pin 212 of slave device 202, thereby transitioning frame marker wire 203 from state S1 to state S2. In turn, slave device 202, as a result of the current flow into pin 212, extracts the data present on the various leads 221–223 at the input to slave 202. For example, it is determined that lead 221 has transmitted a "1" bit because of the need to make the slave end of lead 221 agree with the master end of 221 via state transition S2 to S3. On the other hand, leads 222 and 223 carry a "0" bit because there was no state transition on either lead.

The completion of a data transfer interval occurs when slave 202, after saving the data on data bus 220 into, for example, an input register (not shown), and resetting all voltages on leads 221–223 to zero, awaits for master 201 to reset its voltages to zero on the "1"-bit data leads, then acknowledges to master 201 the receipt of the data by transitioning frame marker wire 203 from state S2 to S3. Master 201, upon receipt of the acknowledgment from slave 202 over frame marker wire 203, initiates another processing activity in preparation for the next data transfer interval.

System 200 is now ready to transfer the next frame of data. In summary, at the start of the next frame, leads 221–223 are state S1, whereas frame marker wire 203 is in state S3. Leads 221–223 convey data bits in the manner just described, and frame marker wire 203 transitions through its second self-timed cycle to register the data bits appearing on bus 220. At the end of the second data transfer interval, leads 221–223 and frame marker wire 203 are again in state S1.

The foregoing operation of this Section B. is referred to as the non-differential mode of executing a data transfer. It is noted that data is transferred by sequencing each data lead propagating a "1" bit from an initial state of S1, to state S2, then to state S3, and at the end of each frame, each data lead propagating a "1" bit is returned to state S1 by cycling from state S3, through state S4, back to state S1 (that is, both the first-self timed cycle and the second self-timed cycle are completed on each data lead propagating a "1" bit in each frame). Initiating each data transfer from state S1 ensures that a data transfer in one frame is independent of a data transfer in any other frame so if there is an error in one frame (say due to "noise" on any data lead), such error does not propagate from frame-to-frame because of the independence of each frame.

On the other hand, it is also possible to effect a data transfer in the so-called differential mode. Operation in this mode does not require that each data lead be returned to state S1; rather, if a data lead has propagated a "1" bit, then at the end of the first self-timed cycle, it is possible to commence another data transfer via the second self-timed cycle. In the above example, it is recalled that at one point in the propagation of a "1" bit on data lead 221, data lead 221 is in state S3 after the data has been save into an input register (not shown). The states of the data leads 221–223 are, respectively, S3, S1, and S1—which represents a stable starting point to commence another self-timed cycle on the data leads. Accordingly, after data has been saved in slave 202, slave 202 then acknowledges to master 201 the storage of data by transitioning frame marker wire 203 from state S2 to S3. Master 201, upon receipt of the acknowledgment from slave 202 over frame marker wire 203, initiates another processing activity in preparation for the next data transfer interval. Thus, the next frame commences with data lead 221 and frame marker wire 203 in state S3, whereas data leads 222 and 223 are in state S1.

C.) Two Device, Symmetrical Finite State Machine

Figure 3:
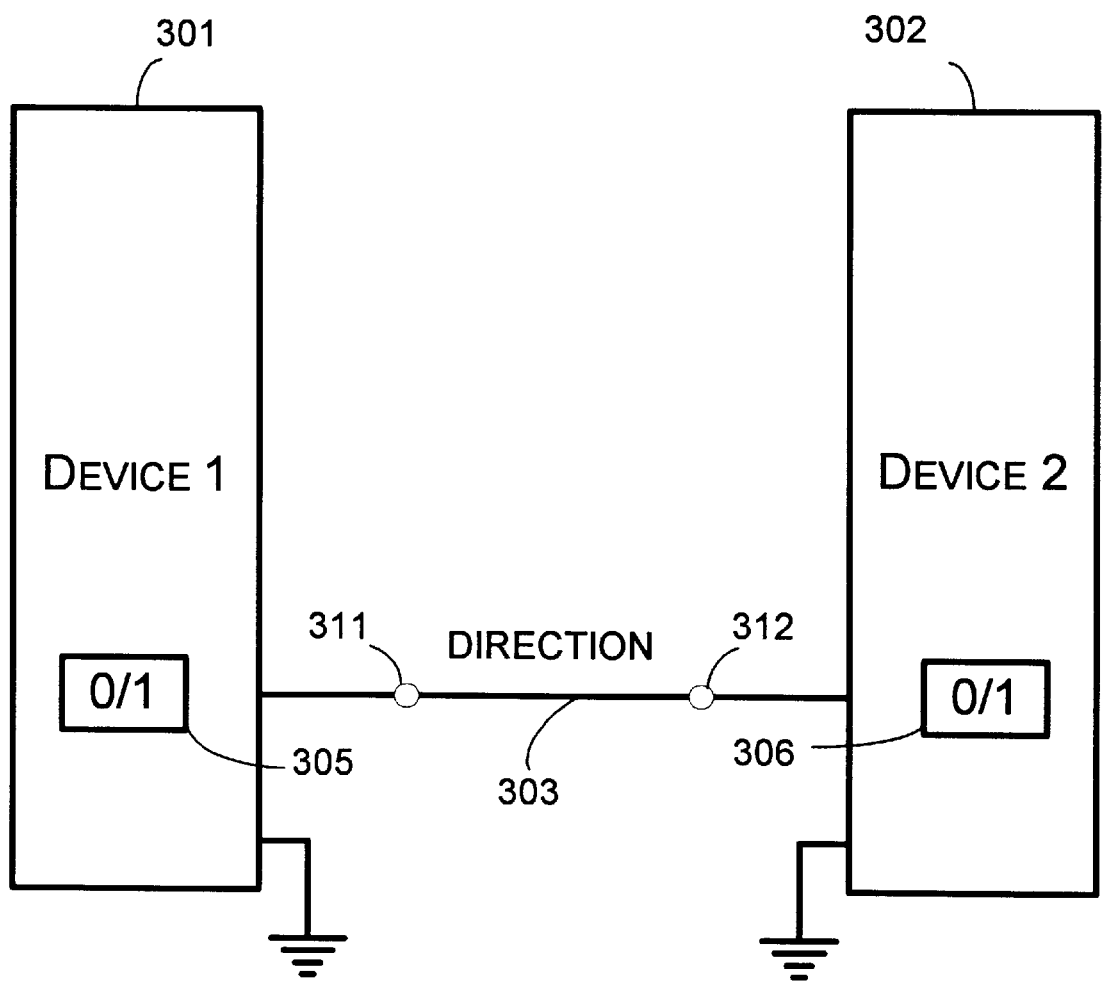
FIG. 3 illustrates a symmetric finite state machine composed of two peer devices interconnected by a direction wire.

Now with reference to FIG. 3, there is shown an illustrative embodiment of finite state machine 300 composed of two devices 301 and 302 interconnected by wire 303. Devices 301 and 302, for purposes of discussion in this section, are peer devices. Device 301 is coupled to one end of wire 303 via its input/output pin 311 and, similarly, device 302 is coupled to the other end of wire 303 via its input/output pin 312. Wire 303, for reasons that will be evident momentarily, is referred to as the direction wire. In a manner substantially similar to the procedure discussed in the previous section, direction wire 303 implements a sequence of self-timed cycles coordinating devices 301 and 302.

Since devices 301 and 302 are peer devices that are to communicate over a single wire, for each given interval, one of the devices must be accorded master status, and the other then takes on the mode of slave. One illustrative way to effect this arrangement is that of alternately assigning master and slave modes to each device 301 and 302. For instance, upon initialization, device 301 is designated the master, whereas device 302 is designated the slave. To keep track of the assignments, a "mode" bit is set to "1" in bit register 305 to indicate that device 301 is initially the master, whereas a mode bit of "0" is set in bit register 306 to indicate that device 302 is initially the slave.

Given this arrangement, then the description of Section A. carries over for the first self-timed cycle. Thus, direction wire 303 transitions through states S1–S2–S3. However, at the completion of the first-self timed cycle, the mode bit in registers 305 and 306 are changed to bits "0" and "1", respectively, thereby indicating that device 302 is now the master and device 301 is now the slave. Accordingly, the second self timed cycle for this mode of operation is modified from the one depicted in Table 1 in that the state transition is initiated by device 302 reducing its voltage to zero on pin 312, whereupon device 301 returns an acknowledgment by reducing its voltage to zero. The system states for the peer devices are shown below in Table 2:

TABLE 2

| System State | V1 | V2 | I1 | I2 |
|---|---|---|---|---|
| S1 | 0 | 0 | 0 | 0 |
| S2 | 1 | 0 | −1 | 1 |
| S3 | 1 | 1 | 0 | 0 |
| S'4 | 1 | 0 | −1 | 1 |
| S1 | 0 | 0 | 0 | 0 |

It is noted that a new system state S'4 (with entries shown in bold) replaces the previous state S4 in Table 1. Accordingly, the second self-timed cycle in this instance traverses the system states S3–S'4–S1. Upon completion of the second self-timed cycle, the mode bit in registers 305 and 306 change from their previous values to again reverse the master/slave modes.

It is also possible to arrange this finite state machine so that, rather than alternating the roles of master and slave, one device can remain the master until the other device requests the role of master.

D.) Two Device, Symmetrical Finite State Machine With a Data Bus

Figure 4:
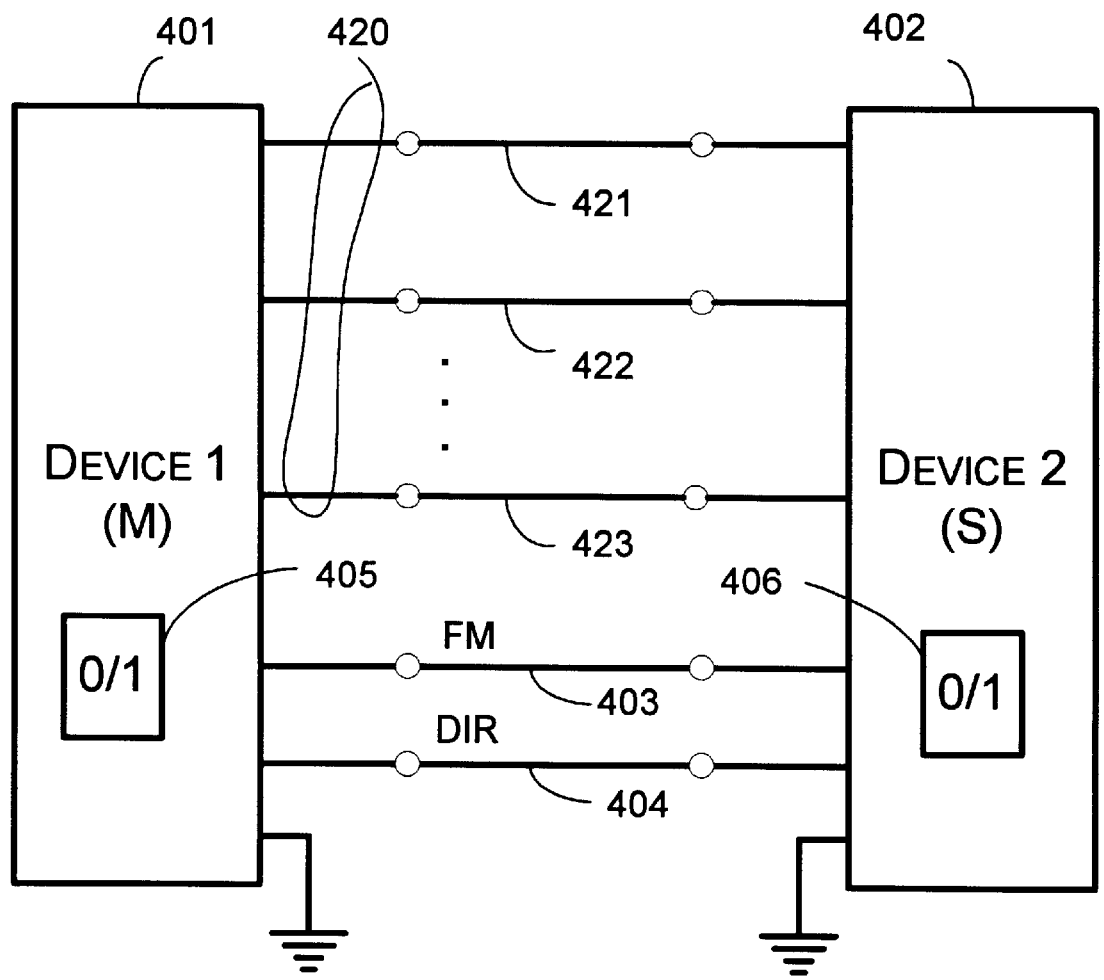
FIG. 4 illustrates a symmetric finite state machine composed of two peer devices interconnected by a parallel data bus, a frame marker wire, and a direction wire.

Now with reference to FIG. 4, there is shown an illustrative embodiment of finite state machine 400 composed of two devices 401 and 402 interconnected by frame marker wire 403, direction bus 404, and data bus 420; data bus 420 has bus leads 421–422, . . . , 423. In addition, device 401 includes mode register 405, whereas device 402 includes mode register 406. Devices 401 and 402, for purposes of discussion in this section, are peer devices. Finite state machine 400 combines the properties of the state machines 200 and 300 discussed in Sections B. and C., respectively, in that finite state machine 400 is arranged to transfer data frames in either direction on bus 420 by peer devices 401 and 402.

By way of brief description to highlight the properties of the combination, it is supposed that wires 403 and 404 as well as all bus leads 421–423 start in system state S1 and mode registers 405 and 406 are set to "1" and "0", respectively (device 401 is the master initially and device 402 is the slave initially). Master device 401, after a processing period, now has data ready for transfer to slave device 402. Master device 401 then applies a voltage to the bus leads which will propagate a "1" bit, and the other bus leads remain at ground potential. Slave device 402 acknowledges receipt of the "1" bit on these bus leads by applying a voltage to the corresponding bus leads at slave device 402. When master device 401 detects the acknowledgment on these bus leads, frame marker 403 is activated by device 401 applying a voltage to the frame marker wire 403 to inform device 402 of stable data on data bus 420. In turn, once the data is registered by device 402, an acknowledgment is transmitted over frame wire marker 403. The voltages on both ends of the leads forming the data bus are reduced to zero by devices 401 and 402—device 402 prior to sending the acknowledgment, and device 401 upon receiving the acknowledgment. Finally, direction wire 404 is activated by device 401 applying a voltage to direction wire 404, which voltage is manifested as a current at device 402. In turn, device 402 acknowledges receipt of this request to reverse master/slave modes by applying a voltage to direction wire 404. Bit register 406 is changed to a "1" bit (device 402 is the next master) upon sending of the acknowledgment, whereas bit register 405 is changed to a "0" bit (device 401 is the next slave) upon receipt of the acknowledgment.

The next data transfer interval commences: with the master being device 402 and the slave being device 401; and with both ends of data bus leads having zero volts applied, both ends of frame marker wire 403 having voltages applied, and both ends of direction bus 404 having voltages applied. In the next data transfer interval both wires 403 and 404 will transition from S3–S'4–S1 as represented by Table 2.

E.) Three Device, Asymmetrical Finite State Machine

Figure 5:
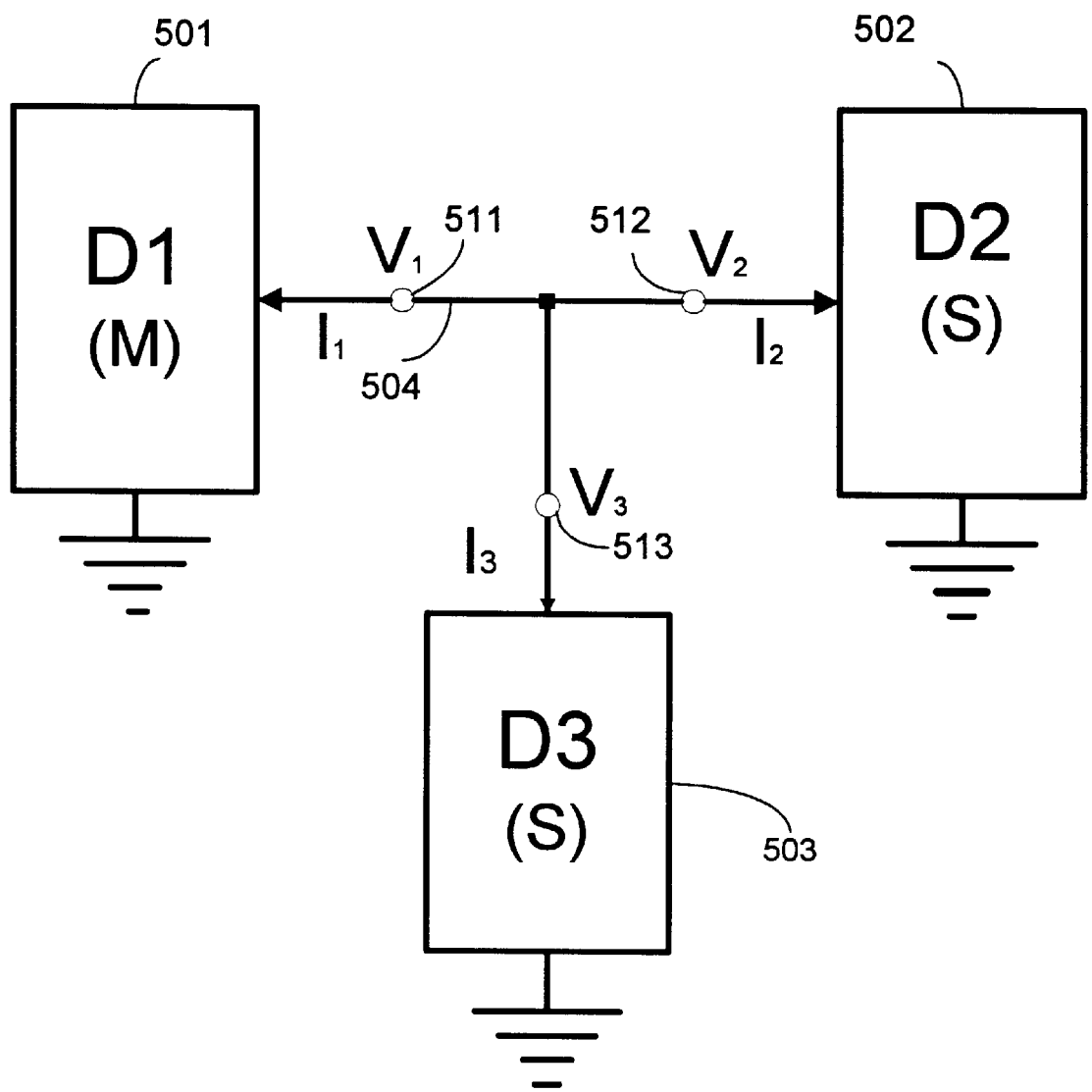
FIG. 5 illustrates an asymmetric finite state machine composed of three devices in a master-slave-slave relationship.

With reference to FIG. 5, there is shown an illustrative embodiment of finite state machine 500 composed of three devices 501, 502 and 502 interconnected by wire 504. Device 501, for purposes of the immediate discussion, is considered the master (M) device, whereas devices 502 and 503 are the slave (S) devices. Device 501 is coupled to wire 504 via its input/output pin 511; similarly, device 502 is coupled to wire 504 via its input/output pin 512, and device 503 is coupled to wire 504 via its input/output pin 513. The voltage level at pin 511 is designated as V1, and the current into pin 511 is designated I1; similarly, the voltage level at pin 512 is designated as V2, and the current into pin 512 is designated I2, and the voltage level at pin 513 is designated as V3, and the current into pin 513 is designated I3. (For the sake of ease of presentation, but without loss of generality, it is assumed that the voltages levels are normalized to unity).

As guided by the discussion in the foregoing sections, especially section A., it is evident that the currents I1, I2, and I3 are zero for only two overall system states, namely, whenever V1=V2=V3=0 or V1=V2=V3=1. Thus, if the initial system state is such that all voltages are zero, and then master device 501 signals a transition by applying a voltage V1=1 to pin 511, current I1 flows from master device 501 onto wire 504. The current I1 will only be reduced to zero when slave 502 applies a voltage V2=1 and slave 503 applies a voltage V3=1. Master device 501 monitors its current, and when I1=0, then master device 501 registers an acknowledgment by both slaves to the transitioning by master device 501. The transitioning to the system state V1=V2=V3=1 completes a first self-timed cycle. A second self-timed cycle commences whenever master device 501 signals another transition by removing voltage V1, that is, by setting V1=0. The acknowledgment is registered only when both slaves reduce their respective voltages to zero.

Illustrative Methodology

Figure 6:
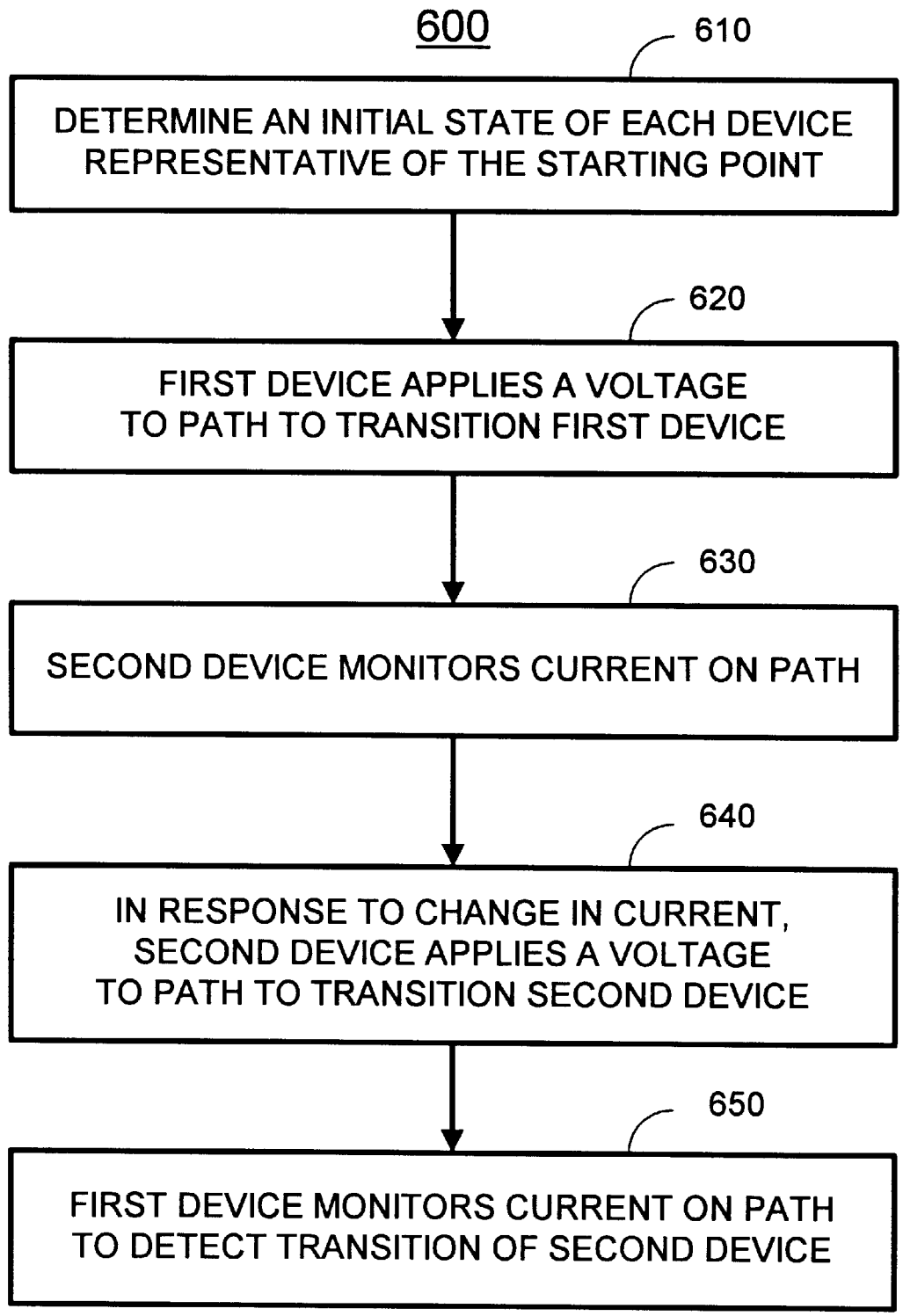
FIG. 6 is a flow diagram of the method carried out by the asymmetric finite state machine depicted in FIG. 1.

With reference to FIG. 6, there is shown illustrative flow diagram 600 of the method carried out by the finite state machine of FIG. 1. In particular, the processing by block 610 is invoked to determine the initial state of each device. Then processing by block 620 is initiated to transition the first device to a first transition state by the first device applying a voltage to the path interconnecting the devices. As depicted by block 630, the second device monitors the current on the path at the second device. Whenever a change in current is detected, processing by block 640 is effected to transition the second device to a second transition state by the second device applying a voltage to the path. Finally, as depicted by block 650, the current on the path at the first device is monitored to determine the state transition of the second device.

The methodology set forth in FIG. 6 for the arrangement of FIG. 1 is representative of the concomitant methodologies for the arrangements of FIGS. 2–5 as well.

Although various embodiments which incorporate the teachings of the present invention have been shown and described in detail herein, those skilled in the art can readily devise many other varied embodiments that still incorporate these teachings. For instance, whereas the above descriptions have been couched in terms of block circuit diagrams described by the overall functionality required of the circuit diagrams, more detailed circuit diagrams for carrying out the details of the invention are readily devised. It is to be understood that the inventive subject matter is to be limited only by the claims, which follow.

What is claimed is:

1. A method for coordinating to self-time the states of a distributed finite state machine composed of a first device and a second device interconnected by a single electrical path and ground, the method comprising the steps of determining an initial state of each state device representative of the starting point for the coordination of the states, transitioning the first device to a first transition state by the first device applying a first voltage to the path, monitoring only the current on the path at the second device to determine the state transition of the first device, transitioning the second device to a second transition state by the second device applying a second voltage to the path in response to a change in current on the path at the second device, monitoring only the current on the path at the first device to determine the second state transition of the second device, and maintaining, in response to a change in the current on the path at the first device, the first voltage and the second voltage to thereby complete a self-timed cycle.

2. The method as recited in claim 1 further including, after said step of maintaining, the steps of transitioning the first device to a third transition state by the first device removing the first voltage from the path, monitoring only the current on the path at the second device to determine the third state transition of the first device, transitioning the second device to a fourth transition state by second device removing the second voltage from the path, monitoring only the current on the path at the first device to determine the fourth state transition of the second device, and maintaining, in response to a change in the current on the path at the first device, zero voltages on the first and second device to thereby complete another self-timed cycle.

3. A method for coordinating to self-time the states of a distributed finite state machine composed of a first device and a second device interconnected by a single electrical path and ground, the method comprising the steps of determining an initial state of each state device representative of the starting point for the coordination of the states, transitioning the first device to a first transition state by the first device removing a first voltage from the path, monitoring only the current on the path at the second device to determine the state transition of the first device, transitioning the second device to a second transition state by the second device removing a second voltage from the path in response to a change in current on the path at the second device, monitoring only the current on the path at the first device to determine the second state transition of the second device, and maintaining, in response to a change in the current on the path at the first device, zero voltages on the first and second device to thereby complete a self-timed cycle.

4. The method as recited in claim 3 further including, after said step of maintaining, the steps of transitioning the first device to a third transition state by the first device applying the first voltage to the path, monitoring only the current on the path at the second device to determine the third state transition of the first device, transitioning the second device to a fourth transition state by second device applying the second voltage to the path, monitoring only the current on the path at the first device to determine the fourth state transition of the second device, and maintaining, in response to a change in the current on the path at the first device, the first voltage and the second voltage to thereby complete another self-timed cycle.

5. A method for coordinating to self-time the states of a distributed finite state machine composed of a first device and a second device interconnected by a single electrical path and ground, the method comprising the steps of determining an initial state of each state device representative of the starting point for the coordination of the states, executing a first processing state in the first device, transitioning the first device from the first processing state to a first transition state by the first device applying a first voltage to the path, monitoring only the current on the path at the second device to determine the state transition of the first device, executing a second processing state in the second device in response to a change in current on the path at the second device, transitioning the second device from the second processing state to a second transition state by second device applying a second voltage to the path, monitoring only the current on the path at the first device to determine the state transition of the second device, and executing a third processing state in the first device in response to a change in current on the path at the first device to complete a self-timed cycle.

6. The method as recited in claim 5 further including, after the step of executing a third processing state in the first device in response to a change in current on the path at the first device, the steps of transitioning the first device from the third processing state to a third transition state by the first device removing the first voltage from the path, monitoring only the current on the path at the second device to determine the state transition of the first device, executing a fourth processing state in the second device in response to a change in current on the path at the second device, transitioning the second device from the fourth processing state to a fourth transition state by second device removing the second voltage from the path, monitoring only the current on the path at the first device to determine the state transition of the second device, and returning to the initial state of each state device in response to a change in current on the path at the first device to complete another self-timed cycle.

7. A method for coordinating to self-time the states of a distributed finite state machine composed of a first device and a second device interconnected by a single electrical path and ground, the method comprising the steps of determining an initial state of each state device representative of the starting point for the coordination of the states, executing a first processing state in the first device, transitioning the first device from the first processing state to a first transition state by the first device removing a first voltage from the path, monitoring only the current on the path at the second device to determine the state transition of the first device, executing a second processing state in the second device in response to a change in current on the path at the second device, transitioning the second device from the second processing state to a second transition state by second device removing a second voltage from the path, monitoring only the current on the path at the first device to determine the state transition of the second device, and executing a third processing state in the first device in response to a change in current on the path at the first device to complete a self-timed cycle.

8. A method for transmitting data bits in a self-timed cycle from a first device to a second device interconnected by data leads, a frame marker lead, and ground, the method comprising the steps of determining an initial state of each state device representative of the starting point for the transmission of the data bits, signaling a non-zero data bit by the first device applying a first voltage to each data lead carrying a non-zero data bit, monitoring only the current on the data leads at the second device, applying by the second device a second voltage to each data lead having a change in current at the second device, monitoring only the current on each data lead carrying a non-zero data bit at the first device to determine the application of the second voltage, applying a third voltage to the frame marker lead at the first device in response to a change in current on all the data leads carrying a non-zero data bit at the first device, monitoring only the current on the frame marker lead at the second device, reading and storing the data bits on the data leads in the second device in response to a change in current on the frame marker lead at the second device, resetting the voltages on the data leads at the second device, monitoring only the current on the data leads signaling a non-zero bit at the first device to detect the resetting of the voltages on the data leads of the second device, resetting the voltages on the data leads at the first device in response to a change in current at the first device on the data leads signaling a non-zero bit, monitoring only the current on the data leads signaling a non-zero bit at the second device to detect the resetting of the voltages on the data leads of the first device, applying a fourth voltage to the frame marker lead at the second device, monitoring only the current on the frame marker lead at the first device, and resetting the voltage on the frame marker lead in response to a change in current on the frame marker lead at the first device to complete the self-timed cycle.

9. A method for transmitting data bits in a self-timed cycle from a first device to a second device interconnected by data leads, a frame marker lead, and ground, the method comprising the steps of determining an initial state of each state device representative of the starting point for the transmission of the data bits, signaling a non-zero data bit by the first device applying a first voltage to each data lead carrying a non-zero data bit, monitoring only the current on the data leads at the second device, applying by the second device a second voltage to each data lead having a change in current at the second device, monitoring only the current on each data lead carrying a non-zero data bit at the first device to determine the application of the second voltage, applying a third voltage to the frame marker lead at the first device in response to a change in current on all the data leads carrying a non-zero data bit at the first device, monitoring only the current on the frame marker lead at the second device, reading and storing the data bits on the data leads in the second device in response to a change in current on the frame marker lead at the second device, applying a fourth voltage to the frame marker lead at the second device, monitoring only the current on the frame marker lead at the first device, and resetting the voltage on the frame marker lead in response to a change in current on the frame marker lead at the first device to complete the self-timed cycle.

10. A method for coordinating to self-time the states of a distributed finite state machine composed of a first device and a second device interconnected by a direction path and ground, the method comprising the steps of determining an initial state of each state device representative of the starting point for the coordination of the states, initially assigning the first device as the master device and the second device as the slave device, transitioning the first device to a first transition state by the first device applying a first voltage to the direction path, monitoring only the current on the direction path at the second device to determine the state transition of the first device, transitioning the second device to a second transition state by the second device applying a second voltage to the direction path in response to a change in current on the direction path at the second device, monitoring only the current on the direction path at the first device to determine the second state transition of the second device, and when requested, assigning the first device as the slave device and the second device as the master device.

11. The method as recited in claim 10 further including, after the step of assigning the first device as the slave device and the second device as the master device, the steps of transitioning the second device to a third transition state by the second device removing the second voltage from the direction path, monitoring only the current on the direction path at the first device to determine the third state transition of the second device, transitioning the first device to a fourth transition state by the first device removing the first voltage from the direction path in response to a change in current on the direction path at the first device, monitoring only the current on the direction path at the second device to determine the fourth state transition of the first device, and when requested, assigning the first device as the master device and the second device as the slave device.

12. A method for transmitting data bits in a self-timed cycle from a first device to a second device interconnected by data leads, a frame marker lead, a direction lead, and ground, the method comprising the steps of determining an initial state of each state device representative of the starting point for the transmission of the data bits, initially assigning the first device as the master device and the second device as the slave device signaling a non-zero data bit by the first device applying a first voltage to each data lead carrying a non-zero data bit, monitoring only the current on the data leads at the second device, applying by the second device a second voltage to each data lead having a change in current at the second device, monitoring only the current on each data lead carrying a non-zero data bit at the first device to determine the application of the second voltage, applying a third voltage to the frame marker lead at the first device in response to a change in current on all the data leads carrying a non-zero data bit at the first device, monitoring only the current on the frame marker lead at the second device, reading and storing the data bits on the data leads in the second device in response to a change in current on the frame marker lead at the second device, resetting the voltages on the data leads at the second device, applying a fourth voltage to the frame marker lead at the second device, monitoring only the current on the frame marker lead at the first device, resetting the voltages on the data leads and frame marker lead in response to a change in current on the frame marker lead at the first device, transitioning the first device to a first transition state by the first device applying a fifth voltage to the direction path, monitoring only the current on the direction path at the second device to determine the first state transition of the first device, transitioning the second device to a second transition state by the second device applying a sixth voltage to the direction path in response to a change in current on the direction path at the second device, monitoring only the current on the direction path at the first device to determine the second state transition of the second device, and when requested, assigning the first device as the slave device and the second device as the master device to complete the self-timed cycle.

13. A method for coordinating to self-time the states of a distributed finite state machine composed of a master device and a plurality of slave devices interconnected by a single electrical path and ground, the method comprising the steps of determining an initial state of each device representative of the starting point for the coordination of the states, transitioning the master device to a first transition state by the master device applying a first voltage to the path, monitoring only the current on the path at the slave devices to determine the state transition of the master device, transitioning the slave devices each to a second transition state by each slave device applying a second voltage to the path in response to a change in current on the path at each slave device, and monitoring only the current on the path at the master device to determine each second state transition of each slave device to complete a self-timed cycle.

* * * * *